(12) United States Patent
Matsuoka

(10) Patent No.: US 6,424,892 B1
(45) Date of Patent: Jul. 23, 2002

(54) VEHICLE SURROUNDINGS MONITORING DEVICE

(75) Inventor: Katsuji Matsuoka, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/785,256

(22) Filed: Feb. 20, 2001

(30) Foreign Application Priority Data

Sep. 28, 2000 (JP) ........................................ 2000-296453

(51) Int. Cl.[7] ................................................ G06F 7/00
(52) U.S. Cl. ........................... 701/29; 342/70; 343/711; 343/781 R; 340/425.5; 340/435
(58) Field of Search ................... 701/29, 301; 340/901, 340/904, 425.5, 435, 436, 445; 342/70; 343/713, 711, 718, 781 R

(56) References Cited

U.S. PATENT DOCUMENTS

| | | | | |
|---|---|---|---|---|
| 4,210,357 A | * | 7/1980 | Adachi ...................... | 296/84 B |
| 6,034,642 A | * | 3/2000 | Kojima et al. ............... | 343/753 |
| 6,078,294 A | * | 6/2000 | Mitarai ........................ | 343/713 |

FOREIGN PATENT DOCUMENTS

JP        54-45040        4/1979

* cited by examiner

*Primary Examiner*—Yonel Beaulieu
(74) *Attorney, Agent, or Firm*—Sughrue Mion, PLLC

(57) ABSTRACT

A vehicle surroundings monitoring device in which reflection by a mirror is reduced to ensure the desired performance of distance measurement even in a short-distance range. The monitoring device for monitoring surroundings around a vehicle has a transmitting antenna provided in a door mirror assembly of the vehicle to radiate transmitted waves through a mirror surface of the door mirror, and a receiving antenna provided in the door mirror assembly to receive, through the door mirror surface, reflected waves from an object existing near the vehicle. In the this monitoring device, electric wave transmission surfaces are formed as portions of the door mirror surface corresponding to openings surfaces for the transmitting and receiving antennas to limit reflection by the door mirror surface and to enable transmission of electric waves through the door mirror surface. The electric wave transmission surfaces are formed by partially removing a reflective film formed on the mirror surface, by partially cutting off the mirror surface, or by forming metal slits in portions of the door mirror surface or through the entire door mirror surface.

4 Claims, 3 Drawing Sheets

VEHICLE SURROUNDINGS MONITORING DEVICE

BACKGROUND OF THE INVENTION

1. Field of the Invention

The present invention relates to a vehicle surroundings monitoring device mounted on a vehicle and used for monitoring of surroundings around the vehicle and, more particularly, to a vehicle surroundings monitoring device for alarming a driver to enable the driver to avoid contact with or collision against an obstacle particularly at the time of lane change or the like.

The entire content of the basic Japanese Patent Application from which the priority under the Convention is claimed in this application is hereby incorporated by reference into this application.

2. Description of the Related Art

Various radar devices have been proposed which are widely used as a vehicle surroundings monitoring device, a controller for controlling the distance of a vehicle from another vehicle, etc., by being mounted on vehicles.

For example, Japanese Patent Application Laid-Open No. Sho 54-45040 discloses a vehicle surroundings monitoring device having a radar unit. This device is formed by using a portion of a fender mirror and a fender portion of a vehicle.

In the above-described conventional device, a mirror surface is used as an antenna reflector, and electric waves are externally radiated to the mirror surface by using a feeder horn antenna. The feeder horn is therefore exposed to the outside and there is a possibility breakage of the feeder horn or failure of maintenance of the desired performance due to external causes.

Therefore, it is desirable that such an antenna should be housed in a body of a mirror assembly. However, if an antenna is incorporated in a mirror assembly, electric waves from the antenna are reflected by the mirror to cause the radar to operate as if an obstacle always exists within a short distance from the vehicle. When an object actually exists within a short distance from the vehicle, the radar cannot detect the object if the distance resolution of the radar is not sufficiently high. Also, the distance measuring performance may be influenced by the reflection by the mirror to such an extent that the possibility of detection failure or a false alarm is high.

SUMMARY OF THE INVENTION

In view of the above-described problem, an object of the present invention is to provide a vehicle surroundings monitoring device in which reflection by a mirror is reduced to ensure the desired performance of distance measurement even in a short-distance range.

To achieve the above-described objects, according to one aspect of the present invention, there is provided a vehicle surroundings monitoring device which monitors surroundings around a vehicle, the device is characterized by comprising a transmitting antenna mounted in a door mirror assembly of the vehicle, said transmitting antenna for radiating transmitted waves through a mirror surface of a door mirror in the door mirror assembly, a receiving antenna mounted in the door mirror assembly, the receiving antenna for receiving, through the mirror surface of the door mirror, reflected waves from an object existing in the surroundings of the vehicle, and electric wave transmission surfaces formed as portions of the door mirror surface corresponding to opening surfaces for said transmitting and receiving antennas to limit reflection by the door mirror surface and to enable transmission of electric waves through the door mirror surface.

Also, the electric wave transmission surfaces in the door mirror surface are formed by partially removing a reflective film formed on the mirror surface.

Also, the electric wave transmission surfaces in the door mirror surface are formed by partially cutting off the mirror surface.

Also, the electric wave transmission surfaces in the door mirror surface are formed by forming metal slits in portions of the door mirror surface or through the entire door mirror surface.

In the vehicle surroundings monitoring device of the present invention, electric wave transmission surfaces for limiting reflection and for enabling transmission of electric waves are formed as portions of the door mirror surface corresponding to opening surfaces for the transmitting and receiving antennas, thereby limiting reflection by the door mirror surface and maintaining the desired short-range distance measuring performance to provide unerring alarm information to a driver.

DESCRIPTION OF THE PREFERRED EMBODIMENTS

The present invention will be described with respect to embodiments thereof in which embodiments of the present invention in which electric wave transmission surfaces for limiting reflection and for enabling transmission of electric waves are formed as portions of the door mirror surface corresponding to opening surfaces for the transmitting and receiving antennas.

Embodiment 1

A vehicle surroundings monitoring device which represents Embodiment 1 of the present invention will be described with reference to FIG. 1.

Figure 1:
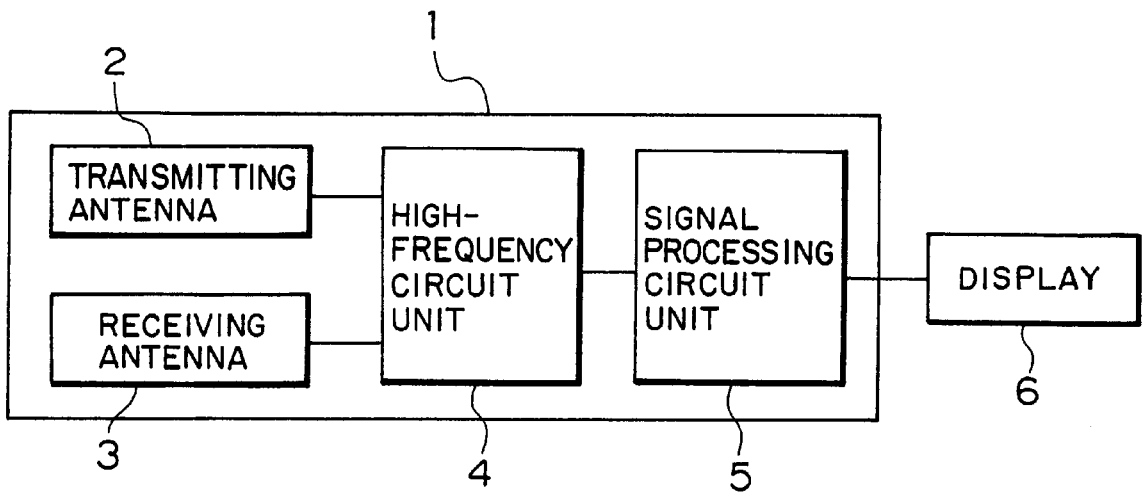
FIG. 1 is a block diagram showing the configuration of a vehicle surroundings monitoring device in Embodiment 1 of the present invention.

Referring to FIG. 1, a vehicle surrounding monitoring device mounted on a vehicle includes a radar 1 and a display 6. The radar 1 has a transmitting antenna 2 for radiating transmitted waves through a door mirror surface described below; a receiving antenna 3 for receiving, through the door mirror surface, reflected waves from an object existing near the vehicle; a high-frequency circuit unit 4 having a transmitting circuit for sending out transmitted waves and a receiving circuit supplied with received waves; and a signal processing circuit unit 5. Results of signal processing in the signal processing circuit 5 are displayed on the display 6 to provide information to a driver.

The radar 1 is mounted in a door mirror assembly of the vehicle, and the display 6 may be placed inside the vehicle or in the vicinity of the door mirror assembly.

Figure 2:
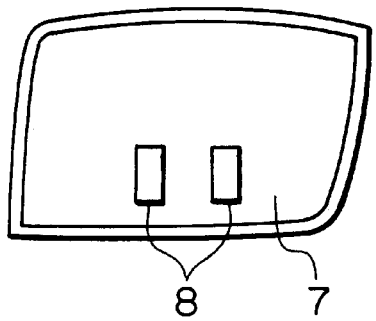
FIG. 2 is a diagram showing a door mirror surface in Embodiment 1 of the present invention.
Figure 3:
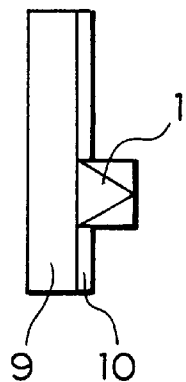
FIG. 3 is a cross sectional view of the door mirror surface in Embodiment 1 of the present invention.

FIG. 2 is a diagram showing the door mirror surface, and FIG. 3 is a cross sectional view of the door mirror surface.

In FIGS. 2 and 3, the door mirror surface is indicated by 7, opening surfaces for the transmitting antenna 2 and the receiving antenna 3 are indicated by 8, a mirror base is indicated by 9, and a reflective film is indicated by 10. As shown in the cross sectional view of FIG. 3, the door mirror surface 7 is formed by the reflective film 10 on the mirror base 9, but the door mirror surface 7 has such a structure that the reflective film 10 is removed from the portions of the door mirror surface 7 corresponding to the opening surfaces 8, thereby forming electric wave transmission surfaces for limiting reflection caused by the mirror surface while enabling transmission of electric waves.

The operation of this embodiment will now be described.

Electric waves generated by the high-frequency circuit 4 are radiated out of the vehicle from the transmitting antenna 2 through the door mirror surface 7 and are reflected by an obstacle such as another vehicle existing near the vehicle having the monitoring device. The reflected waves enter the door mirror through the door mirror surface 7 to be received by the receiving antenna 3 and input to the high-frequency circuit unit 4. The received waves input to the high-frequency circuit unit 4 are down-converted into a low-frequency signal. This signal is input to the signal processing circuit 5, in which the distance to the obstacle, etc., are computed. If a risk of collision against the obstacle is thereby recognized, the driver is alerted to the risk by the display 6.

The amount of electric waves reflected by the door mirror surface 7 is extremely small because of the above-described structure in which the reflective film 10 is removed from the mirror portions corresponding to the opening surfaces 8 for the transmitting antenna 2 and the receiving antenna 3. Therefore, the great part of the electric waves are radiated to the external space. Also, reflected waves from an obstacle can be received by the receiving antenna 3 without being reflected by the door mirror surface 7.

In the case of a radar, the distance resolution (ability to separately recognize two objects) is determined from the bandwidth, and the performance of distance measurement in a short-distance range is low when reflected waves are detected through an extremely small distance. However, by reducing the influence of reflection by the door mirror surface 7 as in Embodiment 1, the desired short-range distance measuring performance can be maintained and therefore the occurrence of a false alarm can be reduced.

Embodiment 2

Embodiment 2 of the present invention also has the configuration shown in the block diagram of FIG. 1, as in Embodiment 1. only features of Embodiment 2 not described with respect to Embodiment 1 will be described below.

Figure 4:
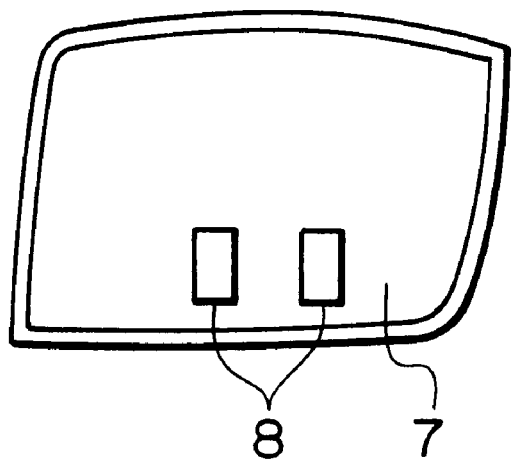
FIG. 4 is a diagram showing a door mirror surface in Embodiment 2 of the present invention.
Figure 5:
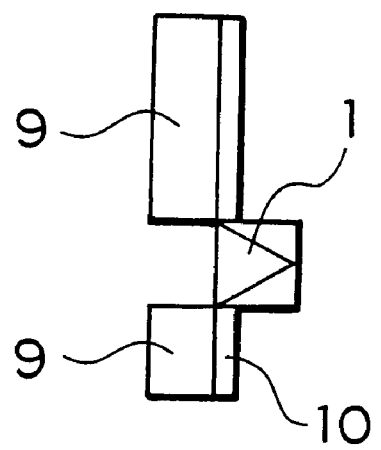
FIG. 5 is a cross sectional view of the door mirror surface in Embodiment 2 of the present invention.

FIG. 4 is a diagram showing a door mirror surface, and FIG. 5 is a cross sectional view of the door mirror surface.

In FIGS. 4 and 5, components corresponding to those of Embodiment 1 shown in FIGS. 2 and 3 are indicated by the same reference numerals. The description for the corresponding components will be omitted.

In Embodiment 2, the structure of the mirror is such that, as shown in FIG. 5 in detail, portions corresponding to opening surfaces 8 for the transmitting and receiving antennas, of the mirror base 9 and the reflective film 10 forming a portion of the door mirror surface 7, are cut and removed to form electric wave transmission surfaces for limiting reflection by the mirror surface and for enabling transmission of electric waves.

The amount of electric waves reflected by the door mirror surface is extremely small because of the above-described structure in which the portions of the mirror surface corresponding to the opening surfaces 8 for the transmitting antenna 2 and the receiving antenna 3 are cut off. Therefore, a great part of the electric waves are radiated to the external space. Also, reflected waves from an obstacle can be received by the receiving antenna 3 without being reflected by the door mirror surface 7. As a result, the desired short-range distance measuring performance can be maintained and the occurrence of a false alarm can therefore be reduced.

Embodiment 3

Embodiment 3 of the present invention also has the configuration shown in the block diagram of FIG. 1, as in Embodiment 1. Only features of Embodiment 3 not described with respect to Embodiment 1 will be described below.

Figure 6:
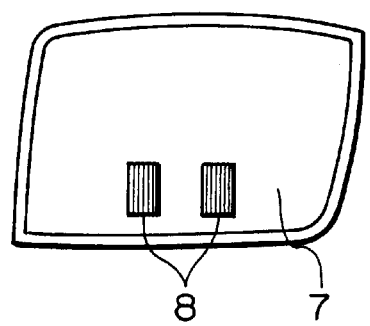
FIG. 6 is a diagram showing a door mirror surface in Embodiment 3 of the present invention.
Figure 7:
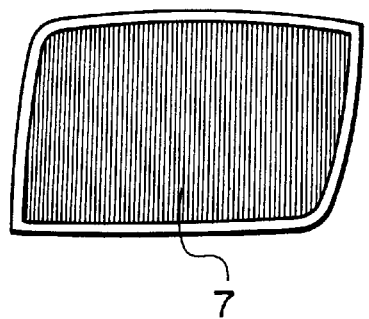
FIG. 7 is a cross sectional view of the door mirror surface in Embodiment 3 of the present invention.

FIG. 6 is a diagram showing a door mirror surface.

In FIG. 6, components corresponding to those of Embodiment 1 shown in FIG. 2 are indicated by the same reference numerals. The description for the corresponding components will be omitted.

In Embodiment 3, the structure of the mirror is such that, as shown in FIG. 6, metal slits are formed in portions of the mirror surface corresponding to opening surfaces 8 of the transmitting and receiving antennas, thereby forming electric wave transmission surfaces for limiting reflection by the mirror surface and for enabling transmission of electric waves.

Figure 8:
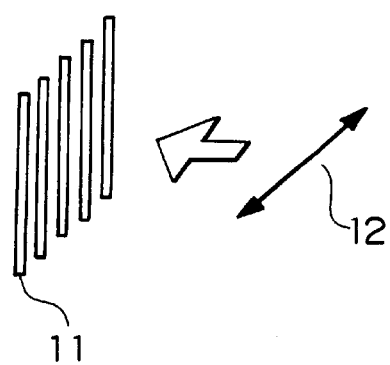
FIG. 8 is a diagram for explaining a content of Embodiment 3 of the present invention.

In general, when linearly polarized electric waves are incident upon metal slits, the electric waves can pass the slits under such a condition that, as shown in FIG. 8, metal slits 11 are arranged in the direction perpendicular to polarized waves (see electric field plane 12) ("Radar Gijutu" The Institute of Electronics, Information and Communication Engineers, p113).

Also, metal slits may be formed through the entire door mirror surface 7 to form an electric wave transmission surface.

The amount of electric waves reflected by the door mirror surface is extremely small because of the above-described structure in which metal slits are formed in the portions of the mirror surface corresponding to the opening surfaces 8 for the transmitting antenna 2 and the receiving antenna 3, or metal slits are formed through the entire mirror surface. Therefore, a great part of the electric waves are radiated to the external space. Also, reflected waves from an obstacle can be received by the receiving antenna 3 without being reflected by the door mirror surface 7. As a result, the desired short-range distance measuring performance can be maintained and the occurrence of a false alarm can therefore be reduced. While the metal slits extending in the vertical direction in the door mirror surface have been described, metal slits extending in the horizontal direction may be formed by considering polarization of electric waves.

According to the present invention, as described above, electric wave transmission surfaces for limiting reflection and for enabling transmission of electric waves are formed as portions of the door mirror surface corresponding to opening surfaces for the transmitting and receiving antennas, thereby limiting reflection by the door mirror surface and maintaining the desired short-range distance measuring performance to provide unerring alarm information to a driver.

Also, the electric wave transmission surfaces in the reflective film on the mirror surface, by partially cutting off the mirror surface, or by forming metal slits in portions of the door mirror surface or through the entire door mirror surface, thus making it possible to limit reflection by the door mirror surface, to maintain the desired short-range distance measuring performance, and to provide unerring alarm information to a driver.

What is claimed is:

1. A vehicle surroundings monitoring device which monitors surroundings around a vehicle, said device comprising:

a transmitting antenna mounted in a door mirror assembly of the vehicle, said transmitting antenna for radiating transmitted waves through a mirror surface of a door mirror in the door mirror assembly;

a receiving antenna mounted in the door mirror assembly, said receiving antenna for receiving, through the mirror surface of the door mirror, reflected waves from an object existing in the surroundings of the vehicle; and electric wave transmission surfaces formed as portions of the door mirror surface corresponding to opening surfaces for said transmitting and receiving antennas to limit reflection by the door mirror surface and to enable transmission of electric waves through the door mirror surface.

2. A vehicle surroundings monitoring device according to claim 1, wherein said electric wave transmission surfaces in the door mirror surface are formed by partially removing a reflective film formed on the mirror surface.

3. A vehicle surroundings monitoring device according to claim 1, wherein said electric wave transmission surfaces in the door mirror surface are formed by partially cutting off the mirror surface.

4. A vehicle surroundings monitoring device according to claim 1, wherein said electric wave transmission surfaces in the door mirror surface are formed by forming metal slits in portions of the door mirror surface or through the entire door mirror surface.

* * * * *